(12) United States Patent
O'Keeffe et al.

(10) Patent No.: US 12,142,767 B2
(45) Date of Patent: Nov. 12, 2024

(54) METAL OXIDES IN LEAD-ACID BATTERIES

(71) Applicant: TROJAN BATTERY COMPANY, LLC, Santa Fe Springs, CA (US)

(72) Inventors: Cormac O'Keeffe, Sligo (IE); Anita Hamilton, Sligo (IE); Marvin Ho, Hammond, IN (US)

(73) Assignee: Trojan Battery Company, LLC, Santa Fe Springs, CA (US)

(*) Notice: Subject to any disclaimer, the term of this patent is extended or adjusted under 35 U.S.C. 154(b) by 0 days.

(21) Appl. No.: 17/357,141

(22) Filed: Jun. 24, 2021

(65) Prior Publication Data
US 2021/0320300 A1    Oct. 14, 2021

Related U.S. Application Data

(63) Continuation of application No. 16/575,572, filed on Sep. 19, 2019, now abandoned, which is a
(Continued)

(51) Int. Cl.
*H01M 4/62*      (2006.01)
*H01M 4/14*      (2006.01)
(Continued)

(52) U.S. Cl.
CPC ............ *H01M 4/628* (2013.01); *H01M 4/14* (2013.01); *H01M 4/16* (2013.01); *H01M 4/662* (2013.01);
(Continued)

(58) Field of Classification Search
CPC ........ H01M 4/628; H01M 4/14; H01M 4/662; H01M 4/72; H01M 10/10; H01M 2300/0011
See application file for complete search history.

(56) References Cited

U.S. PATENT DOCUMENTS 4,327,164 A * 4/1982 Feinberg ............. H01M 50/414
                                                                429/251
5,017,446 A    5/1991 Reichman
(Continued)

FOREIGN PATENT DOCUMENTS

EP         2768046 A1    8/2014
JP         04196059      7/1992

OTHER PUBLICATIONS

Pankaj Arora and Zhengming Zhang: "Battery Separators," American Chemical Society, Chemical Reviews, 2004, vol. 104, No. 10, pp. 4419 4462.
(Continued)

*Primary Examiner* — Adam A Arciero
(74) *Attorney, Agent, or Firm* — Duane Morris LLP

(57) ABSTRACT

Disclosed is a lead acid battery having a negative electrode plate and a positive electrode plate, each plate formed of a lead-antimony grid coated with an active material. A separator is disposed between the first and second electrode plate faces and an electrolyte solution immersing the negative electrode plate, the positive electrode plate the separator. At least one of the lead-antimony electrode grids, the separator or the electrolyte solution contains $TiO_2$, an amount sufficient to suppress the migration of antimony from the positive electrode plate to the negative electrode plate.

11 Claims, 3 Drawing Sheets

Related U.S. Application Data continuation of application No. 15/673,344, filed on Aug. 9, 2017, now abandoned.

(60) Provisional application No. 62/372,688, filed on Aug. 9, 2016.

(51) Int. Cl.
*H01M 4/16* (2006.01)
*H01M 4/66* (2006.01)
*H01M 4/72* (2006.01)
*H01M 10/10* (2006.01)
*H01M 10/12* (2006.01)
*H01M 50/446* (2021.01)

(52) U.S. Cl.
CPC ............ *H01M 4/72* (2013.01); *H01M 10/10* (2013.01); *H01M 10/12* (2013.01); *H01M 50/446* (2021.01); *H01M 2300/0011* (2013.01)

(56) References Cited

U.S. PATENT DOCUMENTS

| | | | |
|---|---|---|---|
| 5,281,496 A | 1/1994 | Clarke | |
| 5,348,817 A | 9/1994 | Rao | |
| 5,549,990 A | 8/1996 | Clough | |
| 8,404,382 B2 | 3/2013 | Beckley | |
| 8,722,249 B2 | 5/2014 | Beckley | |
| 8,771,871 B2 | 7/2014 | Furukawa | |
| 8,900,331 B2 | 12/2014 | Ramasubramanian | |
| 2002/0028386 A1 | 3/2002 | Asada | |
| 2009/0253041 A1 | 10/2009 | Beckley et al. | |
| 2012/0251887 A1 | 10/2012 | Han | |
| 2013/0071723 A1* | 3/2013 | Wertz | H01M 50/431 429/204 |
| 2013/0273409 A1 | 10/2013 | Nandi | |
| 2013/0344396 A1 | 12/2013 | Bosnyak | |
| 2015/0050527 A1 | 2/2015 | Jiang | |

OTHER PUBLICATIONS

Kathryn R. Bullock; "Lead/Acid Batteries," Journal of Power Sources, 51 (1994), pp. 1-17.

Petr Krivik, Karel Micka, Petr Baca, Karel Tonar, Pavel Toser: "Effect of Additives on the Performance of Negative Lead-Acid Battery Electrodes During Formation and Partial State of Charge Operation," Journal of Power Sources 209 (2012), pp. 15-19.

K. Micka, M. Calabek, P. BACA, P. Krivak, R. Labus, R. Bilko: "Studies of Dopes Negative Valve-Regulated Leadacid Battery Electrodes," Journal of Power Sources 191 (2009), pp. 154-158.

Website Article, "Scientists Discover Way to Boost Life of Batteries," hhttp://www.rte.ie/news/2017/0218/853678-battery-life-cork/, Feb. 2017.

Website Article, "Get Outlook.com Email on Your Mobile Device," http://www.microsoft.com/en-us/outlook-com/mobile/?WT.mc_id=outlook_app_signature_1, Feb. 2017.

\* cited by examiner

METAL OXIDES IN LEAD-ACID BATTERIES

CROSS-REFERENCE TO RELATED APPLICATIONS

This application is a continuation of U.S. application Ser. No. 16/575,572, Sep. 19, 2019, which is a continuation of U.S. application Ser. No. 15/673,344 filed on Aug. 9, 2017, now abandoned, which claims the benefit of the filing date of U.S. Provisional Application No. 62/372,688, filed Aug. 9, 2016, entitled "*Metal Oxides in Flooded lead-Acid Battery*." The entire content of these applications are hereby incorporated herein by reference.

BACKGROUND OF THE INVENTION

Field of the Invention

This invention relates to the chemical and electrical arts. In particular, this invention relates to the composition of the components of lead acid batteries.

BACKGROUND OF THE INVENTION

A lead-acid battery includes a housing containing a positive electrode plate and a negative electrode plate. The electrode plates are typically formed of an electrode grid coated with an active material. While primarily constructed of lead, the electrode grids are often alloyed with antimony, calcium, or tin to improve their mechanical characteristics. Antimony is generally a preferred alloying material. The electrode plates are coated with active materials and separated by separator, all in contact with an electrolyte.

It is a drawback of such batteries that antimony may leach or migrate out of the positive electrode. Antimony deposition/poisoning of the negative plate leads to increased hydrogen evolution, electrolyte expenditure and loss of capacity and cycle life. Once the antimony deposits on the surface of negative electrode, it will change potential of negative electrode and cause the battery to be overcharged easily during application. This will undesirably shorten battery life.

One approach to overcoming the problem of antimony migration is to use a separator made of natural rubber. Rubber separators have improved functionality for deep cycle batteries with their antimony suppression feature. Rubber is often combined with a hydrated silica filler to introduce porosity to the rubber material.

Unfortunately, there are numerous drawbacks to the use of a natural rubber separator in addition to its expense. These drawbacks include poor integration of the hydrated silica filler producing pin-holes, low porosity, poor permeability and high electrical resistance. Furthermore, when the natural rubber separator is immersed in the acidic electrolyte of a lead-acid battery, it may oxidize and crack. When a rubber separator cracks, lead dendrites may grow from the negative to the positive electrode, thus causing the battery to short circuit.

Due to these drawbacks and to the expense of rubber, some manufacturers have abandoned the use of rubber altogether, instead, preferring to use a polymer separator for flooded lead-acid batteries. A polymer separator is much sturdier than a rubber separator, and thus does not tend to split when used in a flooded-lead acid battery. Such a polymeric separator may prevent the short circuits caused by lead dendrite growth, but does not suppress antimony migration. Thus, batteries using only a polymer separator have shortened battery life.

Consequently, there remains a long felt need for inexpensive lead acid batteries in which antimony migration has been suppressed. There remains a further long felt need for lead acid batteries having separators in which antimony migration has been suppressed and which possess desirable physical and mechanical properties.

SUMMARY OF THE INVENTION

Now in accordance with the invention, there has been discovered a lead acid battery that overcomes these and related disadvantages. The lead acid battery, which in one embodiment is a flooded lead acid battery, comprises a housing containing a negative electrode plate for a lead acid battery, the negative electrode plate having a first face, and a positive electrode plate for a lead acid battery, the positive electrode plate having a second face opposing the first face, where the electrode plates are comprised of a lead-antimony grid coated with an active material. A separator is disposed between the first and second electrode plate faces and an electrolyte solution, such as an $H_2SO_4$ solution, immersing the negative electrode plate, the positive electrode plate the separator. At least one of the lead-antimony electrode grids, the separator or the electrolyte solution contains $TiO_2$, which in some embodiments is Rutile $TiO_2$ or Anatase $TiO_2$, in an amount sufficient to suppress the migration of antimony from the positive electrode plate to the negative electrode plate.

In one aspect of the invention, the concentration of $TiO_2$ in the electrolyte solution is from about 0.1 to about 20 g/ml and, in some embodiments, the concentration of $TiO_2$ in the electrolyte solution is from about 0.25 to about 15 g/ml, while in some embodiments, the concentration of $TiO_2$, in the electrolyte solution is from about 0.5 to about 10 g/ml. In another aspect of the invention, at least one face of an electrode grid has a coating of $TiO_2$ with a thickness of from about 1 μm to about 10 mm and, in some embodiments, the $TiO_2$, coating has a thickness of from about 10 μm to about 1 mm, while in some embodiments, the $TiO_2$ coating has a thickness of from about 50 μm to about 500 μm. And in another aspect of the invention, the $TiO_2$ is incorporated into a porous membrane coated on the face of at least one electrode plate in an amount from about 1 to about 90 wt. % and, in some embodiments, incorporated into the porous membrane in an amount from about 10 to about 90 wt. %, while in some embodiments the $TiO_2$ is incorporated into the porous membrane in an amount from about 25 to about 75 wt. %.

In another aspect of the invention, the $TiO_2$ is incorporated into a polymeric separator in an amount from about 1% to about 50 wt. % and, in some embodiments, the $TiO_2$ is incorporated into the separator in an amount from about 5% to about 35%, while in some embodiments, the $TiO_2$ is incorporated into the separator in an amount from about 5 wt. % to about 25 wt. %. In still another aspect, the polymeric separator additionally includes natural rubber, RSS 1 or CV 60 rubber.

In still another aspect of the invention, the separator comprises a natural rubber separator and the $TiO_2$ is incorporated into the natural rubber separator in an amount from about 1 to about 40% wt. %. In some embodiments, the $TiO_2$ is incorporated into the natural rubber separator in an amount from about 1 to about 20 wt. % and, in some embodiments, the $TiO_2$ is incorporated into the separator in an amount from about 1 to about 10 wt. %.

BRIEF DESCRIPTION OF THE DRAWINGS

The accompanying drawings, together with the specification, illustrate exemplary embodiments, and, together with the description, serve to explain the principles of these embodiments.

DETAILED DESCRIPTION OF THE ILLUSTRATED EMBODIMENTS

Particular embodiments of the invention are described below in considerable detail for the purpose of illustrating its principles and operation. However, various modifications may be made, and the scope of the invention is not limited to the exemplary embodiments described below. For example, while specific reference is made to flooded lead acid batteries, the invention is of equal use with other lead acid batteries, such as valve regulated lead acid batteries, including bi-polar lead acid batteries, AGM lead acid batteries and gel lead acid batteries.

Figure 1:
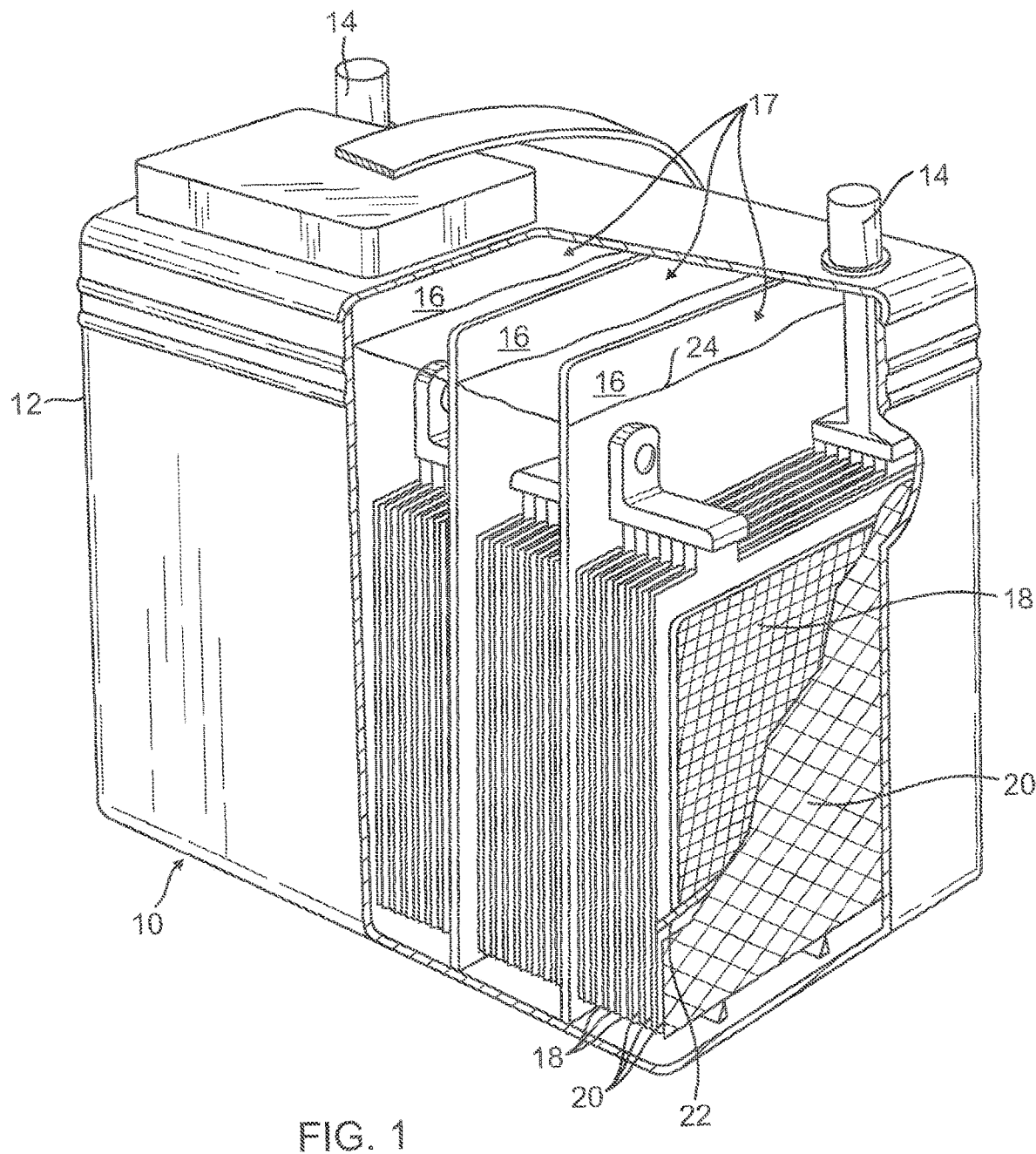
FIG. 1 is a partially cutaway perspective view illustrating a lead acid battery with electrodes in accordance with one aspect of the invention.

FIG. 1 is a partially cutaway perspective view illustrating one aspect of a flooded lead acid battery in accordance with one aspect of the invention. The lead-acid battery 10 includes a housing 12 having positive and negative terminal posts 14 extending through the top of the housing to allow for electrical clamps to connect to the battery in operation.

A number of vertical partition walls 16 create a plurality of separate cell compartments 17. Each cell compartment contains a vertical stack of negative plates 18 and positive plates 20 having opposing faces spaced apart by separators 22 all immersed in an electrolyte solution 24 containing an electrolyte such as sulfuric acid ($H_2SO_4$).

Figure 2:
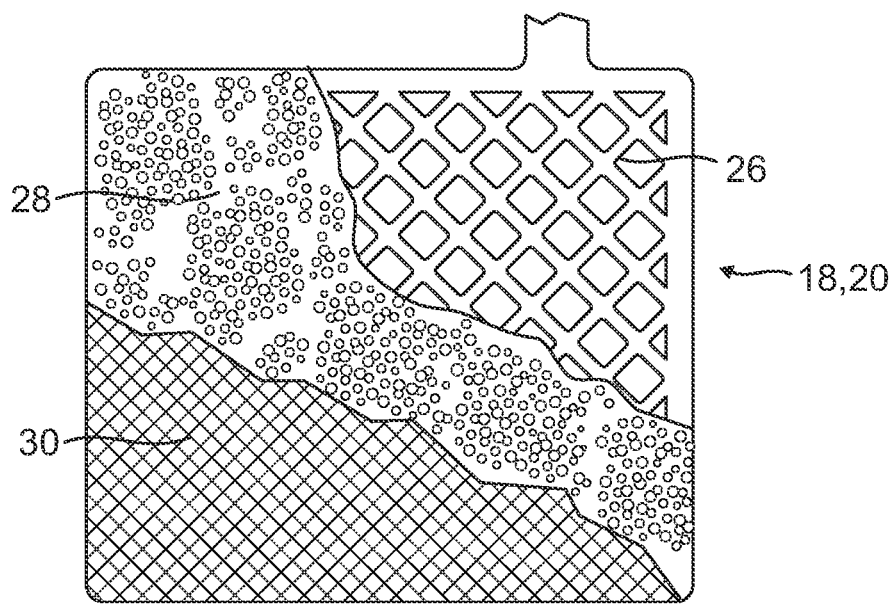
FIG. 2 is a partially cutaway front elevation view illustrating an electrode plate in accordance with one aspect of the invention.

Referring now to FIG. 2, there is shown a partially cutaway front elevation view illustrating one aspect of an electrode plate having coating with a porous, non-woven mat comprised of polymer fibers in accordance with one aspect of the invention. The negative and positive electrode plates 18, 20 are constructed with an underlying electrode grid 26. The electrode grid is primarily formed of lead-antimony alloy.

In one aspect of the invention, the electrode plates 18, 20 are formed by applying an active material paste 28 to the electrode grid 26. The positive and negative active material pastes generally comprise lead oxide (PbO) or lead (II). Suitable electrode plates are described in U.S. Pat. No. 8,546,006, which patent is herein incorporated by reference.

In another aspect of the invention, at least one face of an electrode plate 18, 20 is coated with a porous membrane 30. Suitable porous membrane-coated electrode plates are described in U.S. patent application Ser. No. 15/644,688, filed Jul. 7, 2017, which application is herein incorporated by reference.

And in another aspect of the invention, the separator 22 is formed of a suitable material. Suitable materials include, without limitation, polymeric materials, including polyolefins such as polyethylene, polypropylene, polybutylene, ethylene-propylene copolymers, ethylene-butylene copolymers, propylene-butylene copolymers, and ethylene-propylene-butylene copolymers, as well as natural rubber materials.

In accordance with one aspect of the invention, there has been discovered lead acid batteries containing a metal oxide in an amount sufficient to suppress migration from the positive electrode plate to the negative electrode plate. Titanium dioxide ("$TiO_2$") being the presently preferred metal oxide. Useful forms of $TiO_2$ include both the Rutile and Anatase crystalline forms.

In one aspect of the invention, the metal oxide, such as $TiO_2$, is added directly to the electrolyte solution 24 in an amount sufficient to suppress migration from the positive electrode plate to the negative electrode plate. In some embodiments, the concentration of metal oxide, such as $TiO_2$, in the electrolyte solution is from about 0.1 to about 20 g/ml, in some embodiments, the concentration of metal oxide, such as $TiO_2$, in the electrolyte solution is from about 0.25 to about 15 g/ml, and in some embodiments, the concentration of metal oxide, such as $TiO_2$, in the electrolyte solution is from about 0.5 to about 10 g/ml.

In another aspect of the invention, at least one face of an electrode grid has a coating of the metal oxide, such as $TiO_2$ in an amount sufficient to reduce or delay migration from the positive electrode plate to the negative electrode plate. In some embodiments, the metal oxide, such as $TiO_2$, metal oxide coating has a thickness of from about 1 μm to about 10 mm, in some embodiments, the metal oxide, such as $TiO_2$, coating has a thickness of from about 10 μm to about 1 mm, and in some embodiments, the metal oxide, such as $TiO_2$, coating has a thickness of from about 50 μm to about 500 μm. The coating can be formed by any suitable method.

In still another aspect of the invention, the metal oxide, such as $TiO_2$, is added to the active material applied to at least one negative electrode plate, at least one positive electrode plate or both at least one negative and at least one positive electrode plate in an amount sufficient to reduce or delay migration from the positive electrode plate to the negative electrode plate. In some embodiments, the metal oxide, such as $TiO_2$, is added to the active material in an amount from about 0.1 to about 5 wt. %, in some embodiments, the metal oxide, such as $TiO_2$, is added to the active material in an amount from about 0.1 to about 2 wt. %, and in some embodiments, the metal oxide, such as $TiO_2$, is added to the active material in an a mount from about 0.1 to about 1 wt. %.

In still another aspect of the invention, the metal oxide, such as $TiO_2$, is incorporated into a porous membrane coated on the face of at least one electrode plate in an amount sufficient to reduce or delay migration from the positive electrode plate to the negative electrode plate. In some embodiments, the metal oxide, such as $TiO_2$, is incorporated into the porous membrane in an amount from 1 to about 90 wt. %, in some embodiments, the metal oxide, such as $TiO_2$, is added to the porous membrane in an amount from about 10 to about 90 wt. %, and in some embodiments, the metal oxide, such as $TiO_2$, is added to the porous membrane in an amount from about 25 to about 75 wt. %.

In another aspect of the invention, the metal oxide, such as $TiO_2$, is added to the separator. The separator can be made of any suitable material and includes separators made from polymers, natural rubber or combinations thereof.

In one aspect, the separator is a polymeric separator and the metal oxide, such as $TiO_2$, is present in an amount from about 1% to about 50 wt. %. In another aspect, the metal oxide, such as $TiO_2$, in an amount from about 5% to about 35% and in still another aspect, the metal oxide, such as $TiO_2$, in an amount from about 5 wt. % to about 25 wt. %, The $TiO_2$-containing polymeric separators suppress migration of antimony from the negative electrode plate to the positive electrode plate reducing hydrogen evolution, expenditure of electrolyte and reduction of battery capacity.

In another aspect of the invention, rubber material is integrated into the polymer separator. Suitable rubber materials, include without limitation is natural rubber, RSS 1 or CV 60 rubber. And in one aspect, the amount of rubber integrated into the polymer separator is from about 1 to about 40% wt. %, In another aspect, the amount of rubber is from about 1 to about 20 wt. % and in still another aspect, the amount of rubber is from about 1 to about 10 wt. %.

And in one aspect, the separator is a natural rubber separator and the metal oxide, such as $TiO_2$, is present in an amount from about 1 to about 50%, In another aspect, the metal oxide, such as $TiO_2$, in an amount from about 1 to about 25% and in still another aspect, the metal oxide, such as $TiO_2$, in an amount from about 1 to about 15%,

EXAMPLE 1

$TiO_2$ powder added to a sulfuric acid electrolyte. Lead working electrodes were prepared by cutting lead wire (obtained from McMaster Carr-soft tempered bend-and-stay wire, 0.25" diameter) into approximately 7 cm in length and insulating all except 13 mm on both ends of the wire using insulating tape. Counter electrodes were prepared the same way.

The working electrode, counter electrode and reference electrode ($Hg/Hg_2SO_4$) were placed into a 150 mL tall form glass beaker, along with 100 mL of sulfuric acid (1260 S.G.), ensuring that the exposed area of the electrodes were covered by electrolyte. The other exposed ends of the electrodes were connected to a potentiostat by attaching the black crocodile clip to the working electrode and the green crocodile clip to the reference electrode; while the red and white crocodile clips were attached to the counter electrode.

Conditioning cycles were run on the electrodes from –0.7 V to –1.8 V vs. $Hg/Hg_2SO_4$ for a number of cycles at a scan rate of 3 mV/s until a steady state was achieved (evident from the scans being superimposable on each other). Following the conditioning cycles, the electrodes were subjected to three cycles from –0.7 V to –1.2 V at a scan rate of 3 mV/s, after which the potential was stepped down to –1.2 V vs. $Hg/Hg_2SO_4$ and linear sweep voltammograms were obtained. The linear sweep voltammetry scans (LSVs) were obtained by initially holding the potential at –1.2 V vs. $Hg/Hg_2SO_4$ for 900 s (15 minutes), then sweeping the potential from –1.2 V to –0.7 V vs. $Hg/Hg_2SO_4$ at a scan rate of 3 mV/s (recording every 3 mV to reduce noise contamination). This was done three times for each solution; i.e., (1) blank solution (electrolyte only), (2) solution with added antimony, and (3) solution with antimony $TiO_2$ powder.

Figure 3:
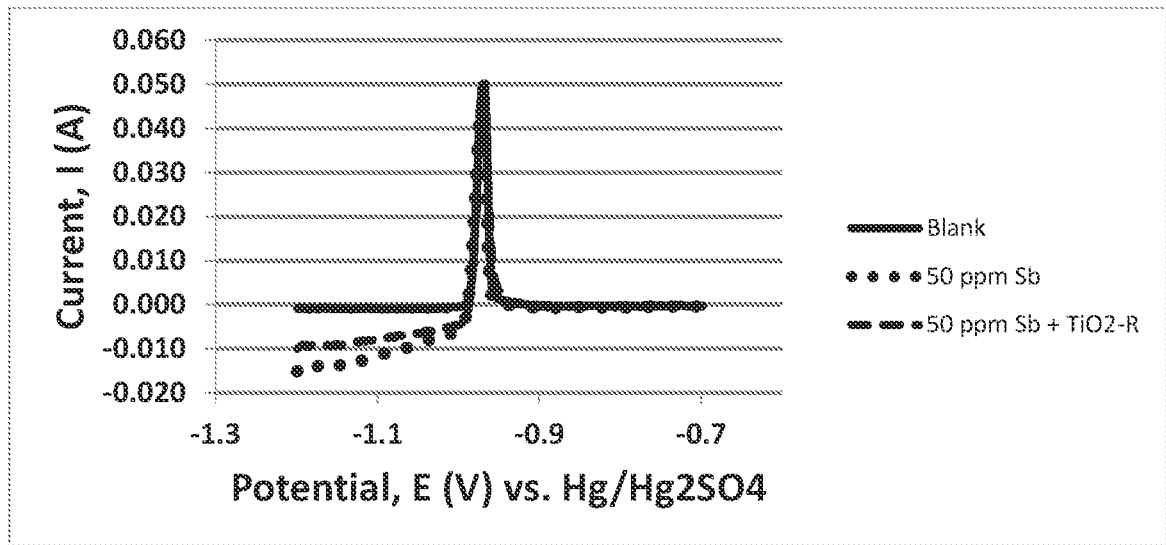
FIG. 3 shows the effect of titanium dioxide powder in suppressing negative current caused by antimony migration.

Titanium dioxide (500 ppm) powder was then added to 50 ppm antimony in 100 mL sulfuric acid electrolyte with a specific gravity of 1260 and LSV sweeps were performed. The effect of the titanium dioxide on reducing the negative current from addition of the antimony is shown in FIG. 3.

EXAMPLE 2

A leachate $TiO_2$ is produced. The leachate is made by heating $TiO_2$ powder, in either Anatase and/or rutile crystalline form, in $H_2SO_4$ (1260 S.G.) at 70° C. for 72 hours. The concentration of $TiO_2/H_2SO_4$ amount is 10 g/100 ml. The components are placed in a round bottom flask with a water cooled condenser. After 72 hours the leachate is allowed to cool and remaining $TiO_2$ is filtered. The specific gravity (S.G). is adjusted to 1260.

Figure 4:
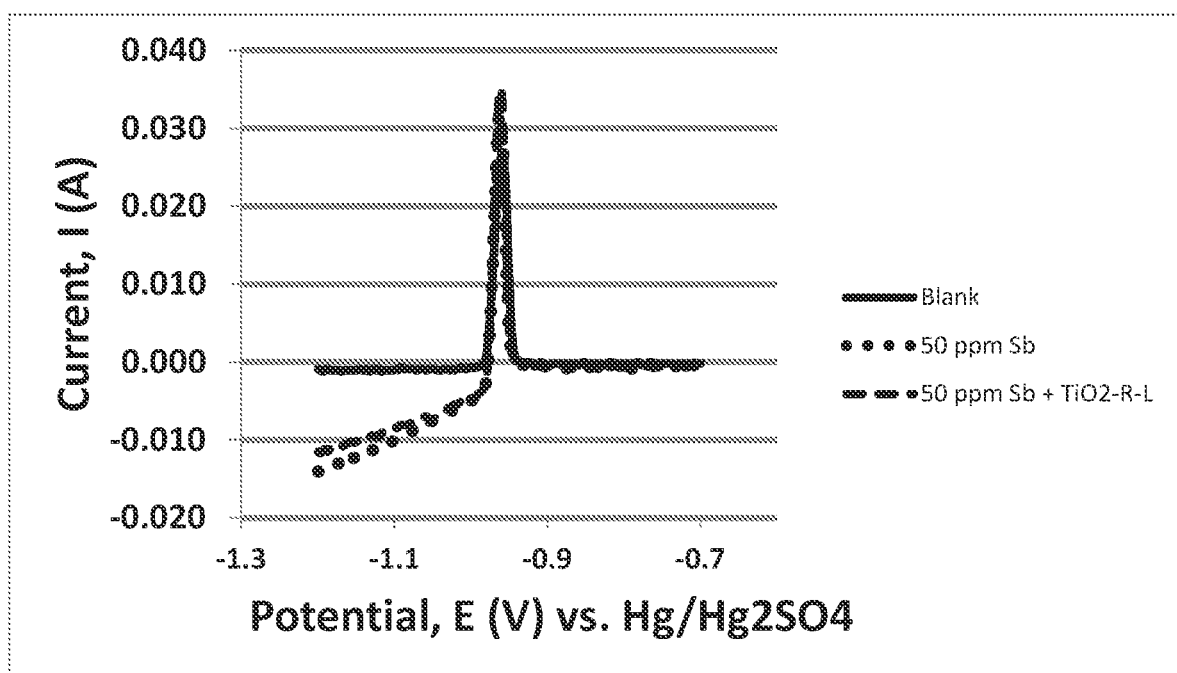
FIG. 4 shows the effect of titanium dioxide leachate on reducing negative current caused by antimony migration.

LSV sweeps are performed as described in Example 1 where 10 ml $TiO_2$ leachate is added to 50 ppm antimony in 100 mL sulfuric acid electrolyte with a specific gravity of 1260. The effect of the $TiO_2$ leachate on reducing the negative current from addition of the antimony is shown in FIG. 4.

Without wishing to be bound by a theory of invention, it is believed that the addition of a metal oxide, such as $TiO_2$, reduces or delays antimony from poisoning the negative electrode and reduces the hydrogen evolution, leading to a longer battery life-time in lead-acid batteries where antimony-lead alloy grids are used. Poisoning of the negative electrode with antimony changes the potential of the electrode and as such, hydrogen evolution occurs easily, which dries out the battery and causes shortening of the lead-acid battery life.

It is believed that the metal oxide, such titanium dioxide, acts as an absorbent and/or leachate to bind antimony ions and inhibit the migration of antimony migration from the positive to negative plates In addition, the metal oxide, such titanium dioxide, improves the physical strengthening of separators made of polymer or natural rubber materials. As titanium dioxide absorbs to or complexes with antimony, it inhibits the antimony migrating to the negative electrode, poisoning it.

The addition of a metal oxide, such as $TiO_2$, eliminates the need for a rubber separator. Thus, the $TiO_2$ reduces the cost of the lead acid battery, by eliminating the need requirement for expensive antimony-suppressing rubber separators which are prone to splitting over time, creating electrical shorts through the battery and leading to end of battery life also.

We claim:

1. An electrolyte solution for a lead acid battery, the electrolyte solution comprising:
   an electrolyte; and
   $TiO_2$ in an amount sufficient to suppress migration of antimony from a positive electrode plate to a negative electrode plate of the lead acid battery.

2. The electrolyte solution of claim 1 wherein a concentration of $TiO_2$ in the electrolyte solution is from about 0.1 g/ml to about 20 g/ml.

3. The electrolyte solution of claim 1 wherein a concentration of $TiO_2$ in the electrolyte solution is from about 0.25 g/ml to about 15 g/ml.

4. The electrolyte solution of claim 1 wherein a concentration of $TiO_2$ in the electrolyte solution is from about 0.5 g/ml to about 10 g/ml.

5. The electrolyte solution of claim 1 wherein the electrolyte includes $H_2SO_4$.

6. A lead acid battery comprising:
   a housing;
   a negative electrode plate in the housing and including a first surface;
   a positive electrode plate in the housing and including a second surface opposing the first surface, where the negative and the positive electrode plates each include a lead-antimony grid coated with an active material;
   a separator between the first and the second surfaces; and an electrolyte solution immersing the negative electrode plate, the positive electrode plate, and the separator, wherein the electrolyte solution contains $TiO_2$ in an amount sufficient to suppress migration of antimony from the positive electrode plate to the negative electrode plate, and a concentration of TiO2 in the electrolyte solution is from about 0.1 g/ml to about 20 g/ml.

7. The lead acid battery of claim 6 wherein the lead acid battery is a flooded lead acid battery.

8. The lead acid battery of claim 6 wherein the $TiO_2$ is Rutile $TiO_2$ or Anatase $TiO_2$.

9. The lead acid battery of claim 6 wherein a concentration of $TiO_2$ in the electrolyte solution is from about 0.25 g/ml to about 15 g/ml.

10. The lead acid battery of claim 6 wherein a concentration of $TiO_2$ in the electrolyte solution is from about 0.5 g/ml to about 10 g/ml.

11. The lead acid battery of claim 6 wherein an electrolyte in the electrolyte solution includes $H_2SO_4$.

\* \* \* \* \*